Patented Dec. 9, 1952

2,621,108

UNITED STATES PATENT OFFICE 2,621,108

TREATMENT OF THIOCYANATE CONTAINING SOLUTIONS FOR THE REMOVAL OF THIOSULFATES

William H. Hill, Mount Lebanon, Pa., and James H. F. Veltman, Long Valley, N. J., assignors to Koppers Company, Inc., Pittsburgh, Pa., a corporation of Delaware No Drawing. Application March 24, 1948,
Serial No. 16,873

10 Claims. (Cl. 23—76)

This invention relates to processes for the treatment of thiocyanate containing solutions to free them of contamination with thiosulfates and is particularly directed to methods for the recovery of water soluble thiocyanates from such solutions substantially uncontaminated with thiosulfates.

In certain processes for the liquid purification of gases obtained in the carbonization of coal there are obtained as by-products solutions containing substantial amounts of both thiocyanates and thiosulfates. Thus, in liquid purification processes in which the hydrocyanic acid content of the gas is recovered as a water soluble thiocyanate such as, for example, in the Thylox and Seaboard processes, the solutions in which the water-soluble thiocyanate is recovered contain also large amounts of water-soluble thiosulfates. Depending upon relative proportions of hydrogen sulfide and hydrocyanic acid in the gas, the content of thiosulfates in such solutions may be as high as three or four parts for every part of water-soluble thiocyanate.

In the treatment for such solutions for the recovery of their thiocyanate content difficulty has been encountered heretofore in obtaining the thiocyanate free of the thiosulfate because the thiocyanates and thiosulfates are difficultly separable from one another especially by any physical means such as recrystallization.

A primary object of the invention is to provide new and useful processes for removing thiosulfate from aqueous solutions of water-soluble thiocyanates of the character described. Another object is to provide new and useful processes for recovering from such solutions the thiocyanate content thereof substantially free of contamination with thiosulfate. Another object of the invention is to treat solutions of the above described class so as to decompose the thiosulfate without decomposing the thiocyanate. Still another object is to treat solutions of the above described class so as to convert the thiosulfate to a form readily separable from the thiocyanate without substantial conversion of the thiocyanate. Other objects are to accomplish these processes without excessive evolution of acidic gases in the treatment. Still other objects of the invention are to avoid the disadvantages of the prior art and to obtain advantages as will be pointed out or will become apparent as the description proceeds. Still other objects will become apparent hereinafter.

It is known in the art that the ammonium thiosulfate contained as a minor constituent in ammonium thiocyanate solutions can be converted to ammonium sulfate by treatment with sulfuric acid according to the equation:

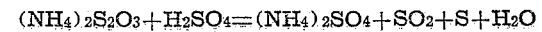

This process has the disadvantage that a very corrosive acid gas, namely, sulfur dioxide is evolved during the reaction and must therefore be entrapped and conducted away from the operation by acid-resistant apparatus. Moreover, the relatively large amount of sulfuric acid required, one mol for each mol of thiosulfate, makes it necessary to exercise great care in adding the acid to the mixed salt solution to avoid decomposition also of the ammonium thiocyanate or other thiocyanate salt to form, for example, colored perthiocyanic acid.

We have now found that thiosulfates can be effectively removed from thiocyanate solutions of the character described above by incorporating sulfurous acid in the solution in the equivalent of about one mol for every two mols of thiosulfate and heating at a temperature below 98° C. as required substantially to convert the thiosulfate to sulfate. By treating thiocyanate solutions of the type described above in this manner we are able to effect decomposition of the thiosulfate to sulfate without substantial evolution of acidic gases and without substantial decomposition of the thiocyanate.

We have found further that the processes of the invention may be advantageously carried out by generating the desired sulfurous acid in situ through the decomposition of thiosulfate. Thus, the processes of the invention may be advantageously carried out by incorporating in the thiocyanate solution of the type described above a quantity of relatively strong acid (relative to the strength of thiosulfuric acid) equal to about one equivalent for every three equivalents of thiosulfate. Acids such as hydrochloric, nitric and phosphoric acids and acid salts such as sodium and ammonium bisulfates may be used effectively for this purpose, although sulfuric acid is preferred because it does not introduce extraneous ions into the solution.

While it has long been known in the art that sodium and ammonium thiosulfates are decomposed by sulfuric acid according to the following type equation:

it has not been recognized heretofore that the thiosulfates contained in thiocyanate liquors of the type described above could similarly be decomposed, evidently because of the long standing practice in the art of decomposing thiocyanates by treating solutions containing them with sulfurous or sulfuric acid and heating in a closed container. We have now found, however, that with thiocyanate solutions of the type described which contain relatively large amounts of thiocyanate, say, one mol of thiocyanate for every three or four mols of thiosulfate or more, can be treated effectively according to this equation with sulfuric acid or some other acidic substance which liberates sulfurous acid in the solution, to convert the thiosulfate to sulfate without substantial decomposition of the thiocyanate provided the temperature is kept low enough, i. e., below 98° C. to prevent excessive decomposition of thiocyanate.

In carrying out the processes of the invention the salt solution is treated with the acid in the stated proportions, usually at room temperature, after which the solution is heated to the desired temperature for a sufficient time to convert substantially all of the thiosulfate to sulfate. The velocity of the reaction is a function of the temperature so that by maintaining the temperature sufficiently high, say, around 90 or 95° C. the reaction may be substantially completed within about 6 hours. According to Gluud et al., Berichte der Gesellschaft fur Kohlentechnik, vol. 4, pp. 203–9 (1933), the sulfur dioxide combines with thiosulfuric acid to form a complex ion which, under the influence of heat, slowly decomposes. By maintaining a temperature somewhere between about 90 and 98° C. we are able to maintain a velocity of decomposition such that satisfactory elimination of thiosulfate can be obtained within a reasonably short time, say, about six hours or so, and at the same time to keep the velocity of the decomposition of ammonium thiocyanate low enough to avoid substantial loss of thiocyanate.

A further feature of the invention lies in the fact that it is possible to treat and to maintain relatively high concentrations of solutions so that little, if any, concentration is necessary to effect precipitation of sulfate on cooling of the solutions. It has been found in this regard that the presence in high concentration of thiocyanate salt in the aqueous solution greatly reduces the solubility of the sulfate therein. It has therefore been found to be relatively easy to obtain by initial crystallization of sulfate salt from the acid treated mixture and filtration of the sulfur and sulfate salt therefrom a substantially pure thiocyanate sufficiently free of sulfate and other adventitious contaminant to be useful as a solution in many of its applications or as a solid which is obtained by evaporation of the solution either to dryness or sufficiently to crystallize out the thiocyanate salt therefrom.

A large and economical source of thiocyanate and thiosulfate salts is to be found in coal gas purification liquors, for example, in the liquors obtained from the Thylox or the Seaboard processes. In the former, either an alkali metal or ammonium salt of an arsenic-sulfur-oxygen acid is employed as the absorbent, and in the latter sodium carbonate is used as the absorbent. In both processes at least some hydrogen sulfide is oxidized to elemental sulfur whereby hydrocyanic acid is converted to thiocyanate. Thus the liquors which accumulate in the process contain substantial quantities of both thiocyanates and thiosulfates. The relative proportion of these two salts depends upon the content of hydrogen sulfide and hydrocyanic acid in the gas which is subjected to purification and, to some extent, upon the particular manner in which the process is conducted. Ordinarily in the Seaboard process the two salts are produced in substantially equal proportions. In the Thylox process the amount of thiocyanate is usually smaller, down to about one part to every three or four parts of thiosulfate. In either case the ratio of thiocyanate to thiosulfate will ordinarily fall within about 3:1 to about 1:3. Within these limits it is possible effectively to apply the processes of the invention for the conversion of the thiosulfate to sulfate without excessive decomposition of thiocyanate. Moreover, within these proportions it is possible effectively to recover thiocyanate by first crystallizing out the sulfate and then recovering the thiocyanate.

In a typical application of the processes of the invention to the recovery of ammonium thiocyanate in the Thylox process, solution is taken from the purification process as required to prevent excessive contamination with accumulated thiocyanate, thiosulfate, polysulfides, etc. and treated according to the processes of the invention. Such solutions will contain in addition, as the reactant, an alkali or ammonium thioarsenate. The solution is acidified sufficiently to cause the precipitation of arsenic as the sulfide on heating of the solution and is thereafter filtered for the separation of the precipitated arsenic sulfide, and whatever sulfur it contains. If desired, the solution can be clarified with filter aids or activated carbon and filtered again, and it may also be evaporated for concentration of the thiocyanates and thiosulfates therein before treatment according to the invention. It is not necessary, however, to filter at an earlier stage the solids which have been precipitated from the solution, but rather the treatment with acid according to this invention can be applied to crude purification liquor with or without treatment to separate the arsenic.

Although in many instances the solution obtained from coke-oven by-product plants will contain the ammonium salts, these solutions can be converted, if desired, to alkali or alkaline earth metal salts by either treatment of crude liquor or the treated liquor (ammonium thiocyanate-ammonium sulfate solution) with the respective alkaline earth metal oxide, or hydroxide or alkali metal carbonate. The recovery by crystallization of sodium thiocyanate, in particular, is greatly facilitated by the unusual solubility characteristics of sodium sulfate and its hydrates, which would be the other salt present in solution therewith. The decahydrate is readily obtained on cooling because of its steep solubility curve. If the anhydrous salt is desired, it can be obtained by increasing the temperature because it becomes less soluble in aqueous solution as the temperature of solution is increased. Of course, in many instances the thiocyanates and thiosulfates will be found in a solution containing soda or other alkali metal ion, as when the liquor from a sodium-carbonate gas purification process is used in a particular coke plant.

The following examples, in which the parts are by weight unless otherwise specified, are given herewith for the purpose of illustrating the invention, and are not intended to limit the scope of invention as defined by the claims hereinafter made:

*Example 1*

11.1 parts of ammonium thiosulfate and 11.1 parts of ammonium thiocyanate contained in approximately 20 parts of water were treated with 2.5 parts $H_2SO_4$ in a normal solution. The vessel in which the solution was contained was thereafter closed and heated at a temperature between 90 and 95° C. for six hours. After cooling, the vessel was opened and it was found that no pressure had been developed therein. Sulfur which had been precipitated during the reaction between the thiosulfate and sulfuric acid was filtered from the solution and found to weigh 2.9 parts. The solution was concentrated and cooled and the precipitated sulfate centrifuged therefrom. Substantially pure ammonium thiocyanate was obtained from the filtrate of the sulfate filtration in practically quantitative yield.

Example 2

An aqueous solution comprising 301 parts of ammonium thiosulfate, 301 parts of ammonium thiocyanate and 329 parts of water were treated with 140 parts of a solution comprising equal parts of concentrated (98%) sulfuric acid and water. The treatment was performed in a closed round bottom flask which was heated in a manner as described in Example 1 at a temperature between 90 to 95° C. for six hours. The reaction mixture was thereafter cooled and filtered, and the precipitate was redissolved in water and refiltered, the insoluble residue therefrom being substantially only sulfur which was dried and weighed. The filtrates from the first and second filtration steps were separately evaporated to dryness. The filtrate from the first said filtration step was fractionally crystallized by evaporating the filtrate until precipitation of a crystal crop was obtained and then cooling and filtering out the precipitated crop, evaporating further the filtrate from the first crystallization step, and repeating the procedure until the filtrate had been evaporated to dryness. This fractional crystallization yielded three separate crops of crystals. Of these crops the third obtained from the original filtrate by concentration to total dryness contained the major portion of ammonium thiocyanate, or 265.5 parts out of a total yield of 278.6 parts. The major portion of the other two crops from the fractional crystallization was ammonium sulfate. The filtrate from the second step was concentrated without any intermediate removal of crystals to yield a single crop. The yield of ammonium sulfate from this crystal crop was 191.6 parts out of a total weight of the crop of 197 parts. Substantially pure ammonium sulfate was readily obtainable by recrystallization of this crop. The total weight of the crystal crops was 582.3 parts.

It appeared from the yields obtained that some of the ammonium thiocyanate originally present in the solution mixture was converted by the sulfuric acid to form ammonium sulfate, perhaps according to the equation:

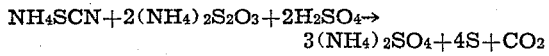
$NH_4SCN + 2(NH_4)_2S_2O_3 + 2H_2SO_4 \rightarrow$
$3(NH_4)_2SO_4 + 4S + CO_2$ It was found from these studies that temperatures higher than the reported range of 90 to 95° C. increasingly effect the above described decomposition of ammonium thiocyanate so that as a preferred temperature limitation it is best to operate at temperatures not higher than the said range.

The processes of the invention are advantageously carried out in a closed container in order to prevent the escape of sulfur dioxide at the beginning of the reaction. Moreover, a closed container is a safety factor in that it retains in the reaction mixture any carbon oxysulfide which forms as an intermediary in the decomposition of the thiocyanate so that it is completely converted to the innocuous carbon dioxide. A pressure vessel is not necessary, however, because the amount of sulfuric acid used in the processes of the invention is so limited that acidic gases are not formed in excess of the amount required in carrying out the reactions desired. In the application of the processes of the invention on a commercial scale, therefore, it is highly advantageous to carry out the treatment in a closed vessel.

In the recovery of the thiocyanate salt from the solutions produced according to the invention, separation of the alkali metal or ammonium sulfate may be effected in any suitable manner. It may be effected, for example, by converting the sulfate to an insoluble salt, calcium sulfate for example. It is more advantageous, however, to effect removal of sulfate by crystallization of the sulfate salt of the solution. This may be effected by evaporation and/or cooling which, as above noted, is favorably influenced by the presence of the relatively large content of thiocyanate in solution or by introducing ammonia either as a gas or a liquid whereby the solubility of the sulfate is still further suppressed as, for example, as disclosed in U. S. Patent 2,424,983, granted August 5, 1947 on an application of William H. Hill, or by the addition of an organic solvent, such as alcohol, in which the thiocyanate salt is soluble. If desired, the solution may be spray dried or otherwise evaporated to dryness and the dry salt mix extracted with ammonia as described in the Hill patent supra, or with some other solvent for the thiocyanate salt such as alcohol.

Solutions already refined and highly concentrated with respect to the thiocyanate by the processes of the invention as, for example, by single crystallization of the contained sulfate salt, can be further purified by treatment with lime to precipitate the sulfate as calcium sulfate whereby thiocyanate is left in solution relatively uncontaminated with sulfate.

The terms "alkali thiocyanate" and "alkali thiosulfate" as employed in the claims hereinafter made are intended to encompass not only the thiocyanates and thiosulfates of the fixed alkali metals such, for example, as sodium and potassium, but also the thiocyanate and thiosulfate of ammonia that is sometimes termed "volatile alkali."

This application is in part a continuation of our copending application, Serial No. 604,532, filed July 11, 1945, now abandoned.

The invention as hereinabove set forth is embodied in particular form and manner but may be variously embodied within the scope of the claims hereinafter made.

We claim:

1. In a process for the treatment of aqueous solutions containing thiocyanate and thiosulfate salts in solution in the proportions of about 1:3 to 3:1, the steps of heating said solution in the presence of sulfurous acid in the equivalent of about one mol for every two mols of thiosulfate at a temperature between about 90° and 98° C. as required substantially to convert the thiosulfate to sulfate and separating from said solution the sulfate thus formed.

2. In a process for the treatment of aqueous solutions containing thiocyanate and thiosulfate salts in solution in the proportions of about 1:3 to 3:1, the steps of introducing sulfuric acid in the said solution in the amount of about one equivalent of sulfuric acid for every three equivalents of thiosulfate and heating at a temperature between about 90° and 98° C. as required substantially to convert the thiosulfate to sulfate.

3. In a process for the treatment of aqueous solutions containing thiocyanate and thiosulfate salts in solution in the proportions of about 1:3 to 3:1, the steps of introducing sulfuric acid in the said solution as required to provide about one mol of sulfuric acid for every three mols of thiosulfate, and heating the thus treated solution in a closed vessel at a temperature between about 90° and 98° C. as required substantially to convert the thiosulfate to sulfate.

4. In a process for the treatment of aqueous solutions containing thiocyanate and thiosulfate salts in solution in the proportions of about 1:3 to 3:1, the steps of introducing sulfuric acid in the said solution as required to provide about one mol of sulfuric acid for every three mols of thiosulfate, and heating the thus treated solution in a closed vessel at a temperature of between about 90 and 98° C. as required substantially to convert the thiosulfate to sulfate.

5. In a process for the treatment of aqueous solutions containing thiocyanate and thiosulfate salts in solution in the proportions of about 1:3 to 3:1, the steps of heating said solution in the presence of sulfurous acid in the equivalent of about one mol for every two mols of thiosulfate at a temperature between about 90° and 98° C. as required substantially to convert the thiosulfate to sulfate, effecting a precipitation of the contained sulfate salt from the treated solution, separating the precipitated sulfate salt and isolating thiocyanate from the resulting solution.

6. The process for the separation and recovery of alkali thiocyanate from aqueous solution thereof containing alkali thiocyanate and alkali thiosulfate in the ratio of about 1:3 to about 3:1, while avoiding substantially completely the evolution of acidic gases during such separation process, comprising: Treating the aqueous solution with about one-third of a molar equivalent, in respect of the thiosulfate, of sulfuric acid and heating the solution in a closed vessel at a temperature between about 90° and 98° C. as required to effect reaction therebetween; and thereafter evaporating the solution to crystallize alkali sulfate formed by the said acid treatment; separating crystallized alkali sulfate from the solution; and recovering alkali thiocyanate from the mother liquor from the alkali sulfate crystallization.

7. A process for the separation and recovery of refined alkali thiocyanate from aqueous solution thereof containing alkali thiocyanate and alkali thiosulfate in the ratio of about 1:3 to about 3:1, while avoiding substantially completely the evolution of acidic gases or the decomposition of alkali thiocyanate during such separation process, comprising: adding to the solution approximately one-third of an equivalent of sulfuric acid, in respect of the thiosulfate contained therein; heating the acidified solution in a closed vessel to a temperature between 90° to 98° C. as required to effect decomposition by the acid of the thiosulfate aforesaid; cooling and evaporating the solution fractionally to crystallize alkali sulfate formed by the said acid treatment; and, after removal of at least one sulfate crystal crop from the solution, recovering alkali thiocyanate therefrom by evaporation.

8. In a process for the separation and recovery of refined alkali thiocyanates from gas-purification liquors obtained in the Thylox process for the purification of coke-oven gas which contain the reactant, thioarsenate, and the contaminants alkali thiosulfate and polysulfide, the steps of removing thioarsenate from said liquors, introducing in the thus treated liquor approximately one-third of an equivalent of sulfuric acid for each equivalent of thiosulfate therein, heating the acidified solution in a closed vessel to a temperature between 90° C. to 98° C. as required to effect decomposition by the acid of the thiosulfate aforesaid; cooling and evaporating the solution fractionally to crystallize alkali sulfate formed by the said acid treatment; and, after removal of at least one sulfate crystal crop from the solution, recovering alkali thiocyanate therefrom by evaporation.

9. A process for the separation and recovery of refined alkali thiocyanate from gas purification liquors of a by-product coke plant containing ammonium thiocyanate, thioarsenate and thiosulfate, comprising: mildly acidifying, heating and concentrating the gas liquors to precipitate thioarsenate as elemental sulfur and arsenic sulfide therefrom; filtering so-deposited materials from the so-concentrated gas liquors; treating the filtrate with approximately one-third of an equivalent of sulfuric acid in respect of ammonium thiosulfate contained therein; heating the acidified solution in a closed vessel at a temperature between 90° to 98° C. as required to effect substantially complete decomposition of the ammonium thiosulfate aforesaid to ammonium sulfate; evaporating and cooling the solution fractionally to crystallize first ammonium sulfate formed by the said acid treatment; and, after removing at least one crop of ammonium sulfate from the solution, recovering ammonium thiocyanate therefrom.

10. In a process for the treatment of aqueous solutions containing thiocyanate and thiosulfate salts in solution in the proportions of about 1:3 to 3:1, the steps of heating said solution in the presence of sulfuric acid at a temperature between about 90° and 98° C. as required to convert thiosulfate to sulfate, the amount of sulfuric acid being about one equivalent of sulfuric acid for every three equivalents of thiosulfate, and separating from said solution the sulfate thus formed.

WILLIAM H. HILL.
JAMES H. F. VELTMAN.

REFERENCES CITED

The following references are of record in the file of this patent:

UNITED STATES PATENTS

| Number | Name | Date |
|---|---|---|
| 1,908,515 | Keller | May 9, 1933 |
| 2,313,680 | Smith | Mar. 9, 1943 |

OTHER REFERENCES

Glund et al.: Chem. Abstracts, vol. 27 (1933), page 3678.